(12) United States Patent
Gross

(10) Patent No.: US 6,748,115 B1
(45) Date of Patent: Jun. 8, 2004

(54) PERCEPTUALLY LOSSLESS IMAGE COMPRESSION

(75) Inventor: Ari Gross, New York, NY (US)

(73) Assignee: Cvision Technologies LLC, Flushing, NY (US)

( * ) Notice: Subject to any disclaimer, the term of this patent is extended or adjusted under 35 U.S.C. 154(b) by 0 days.

(21) Appl. No.: 09/336,467

(22) Filed: Jun. 18, 1999

Related U.S. Application Data

(60) Provisional application No. 60/090,018, filed on Jun. 19, 1998.

(51) Int. Cl.$^7$ .................................................. G06F 9/70

(52) U.S. Cl. ........................................ 382/237; 382/218

(58) Field of Search ........................... 382/237, 217–222, 382/165, 168–172, 181

(56) References Cited

U.S. PATENT DOCUMENTS

| | | | |
|---|---|---|---|
| 5,166,986 A | * 11/1992 | Mizuoka et al. ............ | 382/172 |
| 5,303,313 A | 4/1994 | Mark et al. | |
| 5,539,841 A | * 7/1996 | Huttenlocher et al. ...... | 382/218 |
| 5,751,859 A | 5/1998 | Howard | |
| 5,778,095 A | 7/1998 | Davies | |
| 5,818,965 A | 10/1998 | Davies | |
| 5,835,638 A | * 11/1998 | Rucklidge et al. .......... | 382/257 |

FOREIGN PATENT DOCUMENTS

JP         10093817 A    * 4/1998     ............ H04N/1/40

OTHER PUBLICATIONS

Gross, et al., Homeomorphic Digitization, Correction, and Compression of Digital Documents, Jun. 20, 1997, Proceedings of the Workshop on Document Analysis, pp. 89–96.
Gross, et. al., Fast Non–Parametric Detection of Regular Structure using Digital Geometric Primitives, Proceedings of SPIE vol. 3168, Jul. 28, 1997, pp. 338–347, Vision Geometry VI.
Gross, et al., Digital geometric methods in document image analysis, Pattern Recognition 32, 1999, pp. 407–429.

* cited by examiner

Primary Examiner—Thomas D Lee
Assistant Examiner—Stephen Brinich
(74) Attorney, Agent, or Firm—Seth Natter; Natter & Natter

(57) ABSTRACT

An image compression technique employs selecting a gray level threshold value for converting a gray level digital image input into a bi-level input which minimizes weak connectivity, wherein weak connectivity comprises a checkerboard pattern found in a 2×2 array or neighborhood of pixels. The threshold value is determined by traversing the array of pixels comprising the document in a single path, examining successive 2×2 neighborhoods and incrementing a plus register for the gray level value which a checkerboard pattern first appears and incrementing a minus register for the gray level value at which the checkerboard pattern no longer exists. The total number of weak connectivity checkerboards for each gray level threshold value is calculated based upon the difference between the values stored in the registers. An improved distance measure for determining a match between models comprises a modification of the Hausdorff measure by limiting such measure to a single quadrant, resulting in a lower mismatch rate.

25 Claims, 8 Drawing Sheets

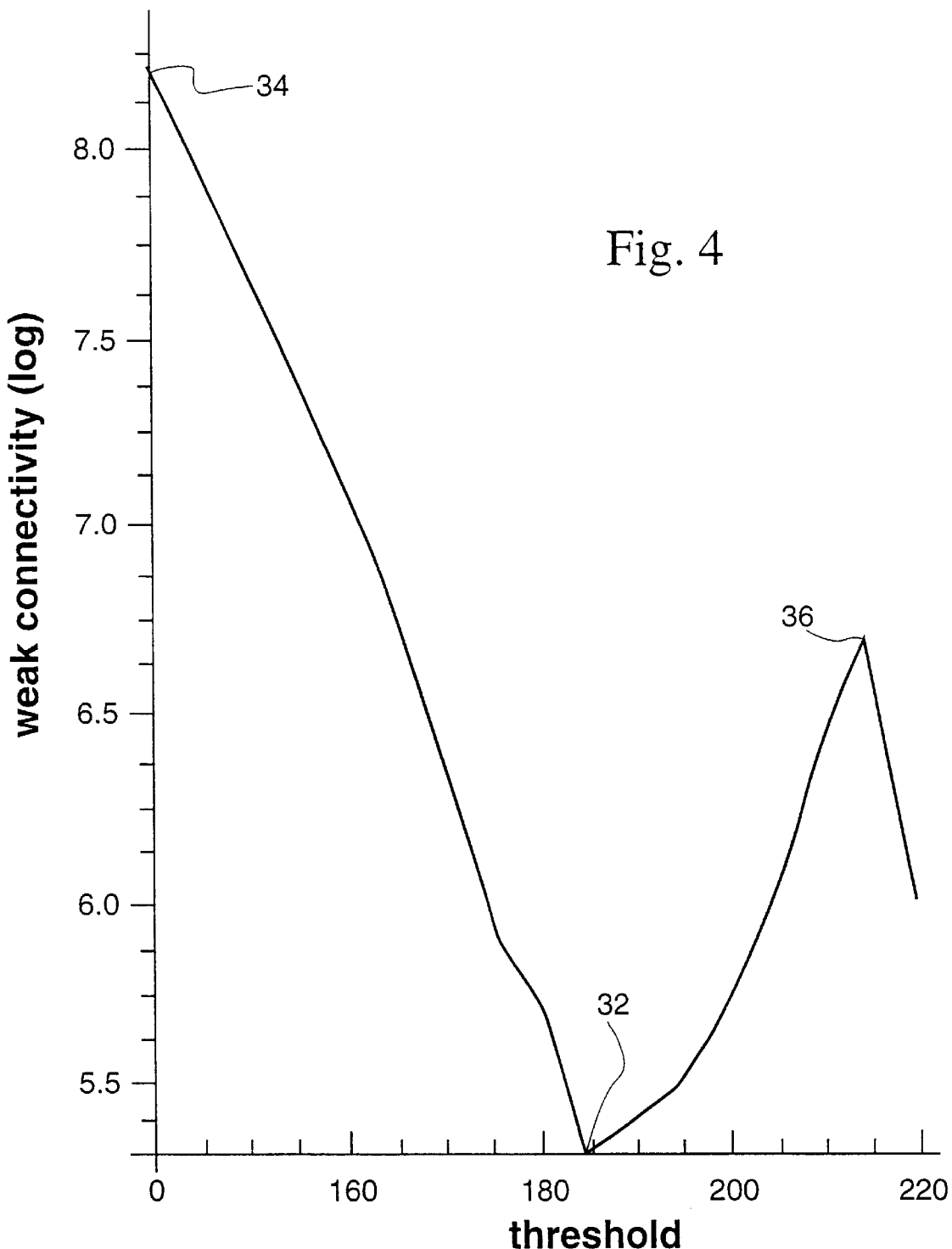

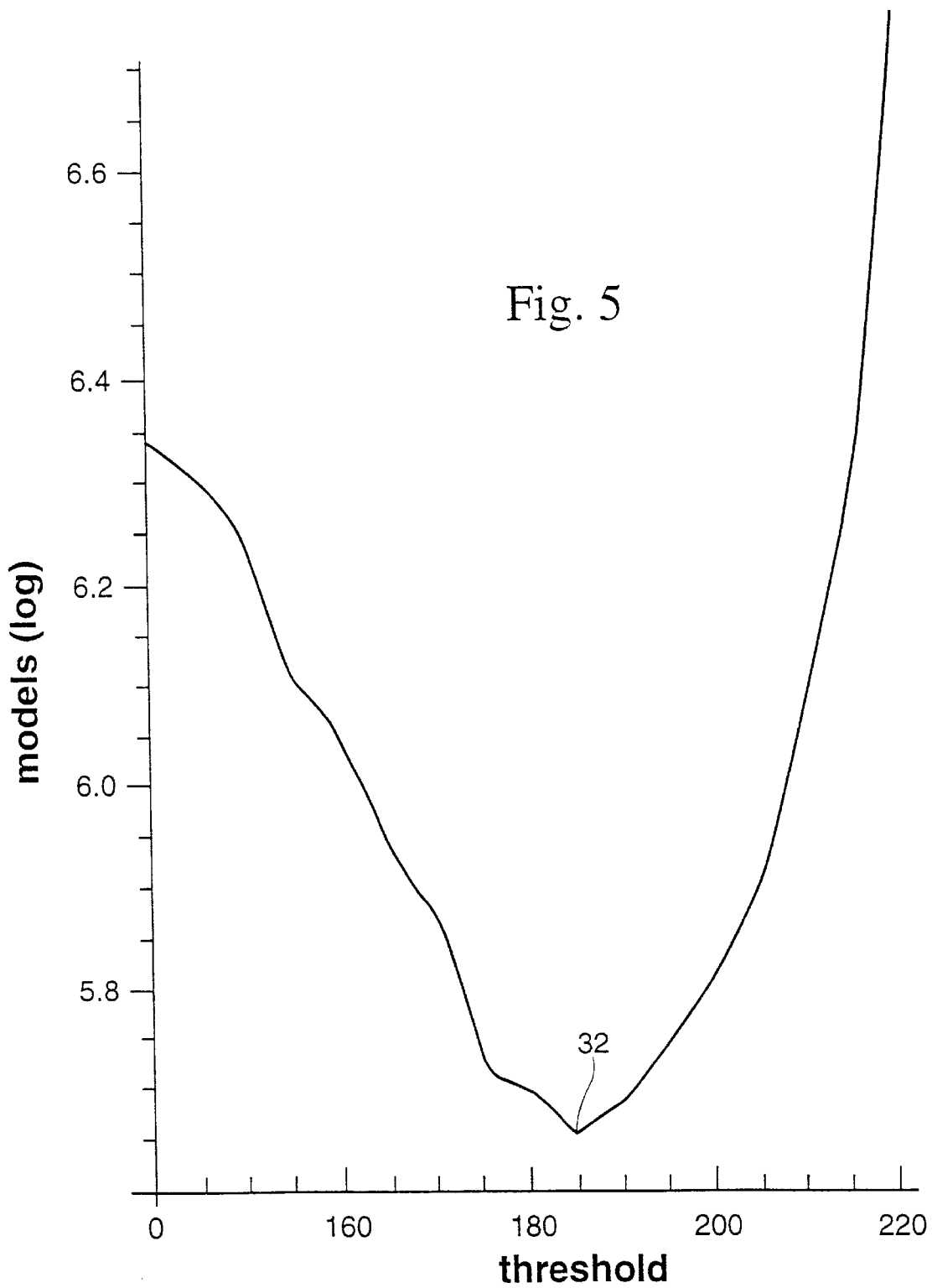

WEAK CONNECTIVITY HISTOGRAM

PERCEPTUALLY LOSSLESS IMAGE COMPRESSION

RELATED APPLICATIONS

This application claims the benefit of U.S. Provisional Application No. 60/090,018 filed Jun. 19, 1998.

BACKGROUND OF THE INVENTION

1. Field of the Invention

The present invention relates generally to pattern matching based compression of digital document images and more specifically to a system for obtaining a minimal number of equivalence classes or model bitmaps for perceptually lossless bilevel compression.

2. Antecedent History

There is strong motivation for efficient compression of digital document images. A typical image scanned at 300 dots per inch generates over 1 megabyte of information if stored in raw format. If this image were transferred over a typical modem (56 Kbs), with no noise, it would take well over 2 minutes to transfer a single document page; a 30 page document would take at least an hour to transfer. In addition, a CD-ROM with capacity of roughly 600 Megabytes could store only 600 document pages. Because of the tremendous number of documents transmitted and stored on a daily basis, efficient modes of compression are essential.

Bilevel image compression methods have been typically classified as either lossless or lossy. In lossless compression, the compressed data stream has all the information necessary to reconstruct an exact copy of the original image. Lossless compression techniques typically utilize either run-length encoding or arithmetic encoding to remove redundancy from the data stream. CCITT Group 3 and CCITT Group 4 are among the most widespread compression techniques that use run-length encoding. Using the CCITT Group 4 compression standard, a typical 300 dpi image is compressed into roughly 75 Kbytes, with a compression ratio of approximately 14 to 1 when compared to the raw bilevel image.

More recently, JBIG (Joint Bi-Level Image Experts Group) was introduced as a standard for lossless bilevel image compression. The JBIG standard uses an approximate binary arithmetic coder, known as QM-coder. The improved compression ratio for JBIG images results from a good context model, (i.e., in non-progressive JBIG mode, a half-diameter of 10 previously visited pixels), coupled with an arithmetic encoder that can approximate the entropy bound, given the probability of each context.

When compared to a raw scanned file, the 14:1 compression ratio of CCITT 4 is impressive, but the ASCII text that comprises the scanned document can typically be compressed into a file of less than 5K bytes, which is a further 15:1 reduction in file size when compared to a typical 300 dpi bilevel, CCITT 4 document at 75K bytes.

For a multipage scanned document, where the byte cost of a given font bitmap is amortized against all its references in the document, an additional compression ratio of 15:1 is often still possible with respect to CCITT 4 using a pattern matching format, where each distinct model bitmap is stored or transmitted only once. This class of compression technique is also known as "pattern matching based compression". A thorough review of the development of pattern matching based compression, dating back to 1974, is found in the PhD thesis of Qin Zhang, entitled *"Document Image Compression Via Pattern Matching"*, Dartmouth University, 1997, incorporated herein by reference.

To optimize the compression rates achievable with pattern matching based compression, it is essential to develop a reliable method for finding a minimal set of bitmaps that represent the fonts of a scanned document.

For pattern matching based compression systems, the most effective compression rates, which closely resemble the rates obtained for the OCRed text version of the same document, are achieved in lossy mode. If the same underlying symbol in the prescanned document appears multiple times on the same page, almost inevitably, each such appearance in the digital image results in a distinct bitmap. When these distinct bitmaps are "collapsed" to a single representative model bitmap, some loss of information inevitably occurs. Generally, lossy pattern matching compression methods have attempted to ensure that the bitmaps that are replaced are humanly indistinguishable from the original bitmaps and such methods are often referred to as perceptually lossless.

One of the fundamental problems in any pattern matching based compression system is the risk of mismatching one bitmap with another. As long as the modifications that are the result of lossy compression are restricted to noise removal, there is no perceptual degradation in the digital document, however, even a single false substitution in the image can result in perceptually noticeable changes in the document appearance. For perceptually lossless compression to be a realistic alternative to lossless compression, very precise shape distance measures need to be derived that accurately measure human perceptual differences between two distinct bitmaps.

Pattern matching based compression techniques heretofore assumed as input, bilevel images that had already been converted from gray level through some thresholding process. Such systems typically do not attempt to model or characterize the digitization process. It is important however, to characterize the thresholding process for several reasons. A fundamental reason to attempt to mathematically (or otherwise) model the digitization process is that this model can then be used to characterize how different bitmaps in the digitally scanned document may (or may not) be digitations of the same underlying prototype. Another important reason is that certain steps in processing the image, such as thresholding, can be optimized.

SUMMARY OF THE INVENTION

Image data generated by a scanner is often captured as gray level images, where each pixel has a value in the range of 0–255. The rate of compression of the image data has been determined to be a function of optimization of the gray level threshold value for conversion to a bilevel input. Pursuant to the invention, a gray level threshold is selected for converting the gray level input to a bilevel input which minimizes the number of equivalence classes or model bitmaps. The optimum threshold is that which minimizes the weak connectivity of the document image, wherein weak connectivity comprises a checkerboard pattern found in a 2×2 array or neighborhood of pixels. The gray level threshold value which minimizes weak connectivity has been found to optimize the document compression rate.

A further aspect of the invention deals with a technique for determining the optimum gray level threshold for conversion from gray level to bilevel which involves only a single pass of the image rather than individually ascertaining weak connectivity for each gray level threshold value. The array of pixels of the document is traversed in a single path examining successive 2×2 matrices or neighborhoods and incrementing a plus register for the gray level value at which a checkerboard pattern first appears and incrementing a minus register for the gray level value at which the checkerboard pattern no longer exists.

After the image has been completely traversed, the total number of weak connectivity checkerboards for each gray level threshold value is calculated, based upon the difference between the values stored in the plus register less the values stored in the minus register. The optimal threshold value for the document is then determined and selected as the gray level value having the minimal weak connectivity.

A further feature of the invention relates to determining a distance measure between two discrete shapes which is consistent with human shape perception and capable of modeling scanner digitization, where error is primarily introduced through image quantization. This improved distance measure comprises a variation of the standard Hausdorff measure by limiting such measure to a single quadrant, which results in a lower mismatch rate.

From the foregoing compendium, it will be appreciated that it is an aspect of the present invention to provide a perceptually lossless image compression system of the general character described which is not subject to the disadvantages of the antecedent history aforementioned.

A feature of the present invention is to provide a perceptually lossless image compression system of the general character described which minimizes the number of model bitmaps or equivalence classes through the selection of a gray level threshold for bilevel conversion of a gray level image.

A consideration of the present invention is to provide a perceptually lossless image compression system of the general character described which optimizes image compression through the selection of a gray level threshold value which results in the lowest weak connectivity in the document.

Another aspect of the present invention is to provide a perceptually lossless image compression system of the general character described which includes a technique for rapidly generating a weak connectivity threshold histogram of a document.

A further feature of the present invention is to provide a perceptually lossless image compression system of the general character described which includes a technique for comparison of glyphs which accepts Hausdorff measure deviation within but a single quadrant.

BRIEF DESCRIPTION OF THE DRAWINGS

In the accompanying drawings in which is shown one of the various possible exemplary embodiments of the invention, FIG. 1 comprises a schematized flow chart of the pattern matching based compression system of the prior art, FIG. 4 is a graphical histogram of weak connectivity against threshold values of the same scanned gray level image, FIG. 5 is a graph plotting the number of equivalence classes or model bitmaps against threshold values of the same gray level image.

DESCRIPTION OF THE PREFERRED EMBODIMENT

The following publications are hereby incorporated herein by reference:

*Homeomorphic Digitization, Correction, and Compression of Digital Documents,* Gross, et al. Proceedings of the Workshop on Document Image Analysis, pp 89–96, San Juan PR Jun. 20, 1997

*Fast Non-Parametric Detection of Regular Structure using Digital Geometric Primitives,* Gross, et al. Proceedings of SPIE Volume 3168, pp 338–347 Vision Geometry VI, San Diego Calif. Jul. 28–29, 1997

*Digital geometric methods in document image analysis,* Gross, et al. *Pattern Recognition* 32 (1999), pp 407–429.

The pattern matching based compression system of the present invention does not assume a bilevel image as input, but rather solves for a threshold that is optimal with respect to preserving the document topology. The inventive thresholding technique results in a fewer number of equivalence classes or model bitmaps during the compression process. The thresholding technique is premised upon removing topological ambiguity from the digital document wherever possible. Since weak connections are topologically ambiguous and present difficulties with respect to segmenting pixels into glyphs, the number of such weak connections are to be minimized.

A further aspect of the invention involves using a progressive set of matching criterion which are directly related to the digitization process. Various agents can possibly act on the document between the beginning of the scanning process and when the binary image is finally captured. These include optical blurring, non-monotonic sensor flux and image quantization. The error introduced by blurring, for example, is radially symmetric while quantization error is not. In an idealized scan, the document is placed firmly against the plate glass and the scanner is perfectly calibrated for such distance so that there would be negligible blurring during the scan. In addition, a perfect sensor would have monotonic response, with electronic flux exactly proportional to photonic flux. This leaves only quantization error. For a symbol scanned at the correct sampling rate, with no blurring, a restriction of the Hausdorff distance in accordance with the invention and hereinafter referred to as the "Quadrant Hausdorff" minimizes mismatching.

Figure 1:
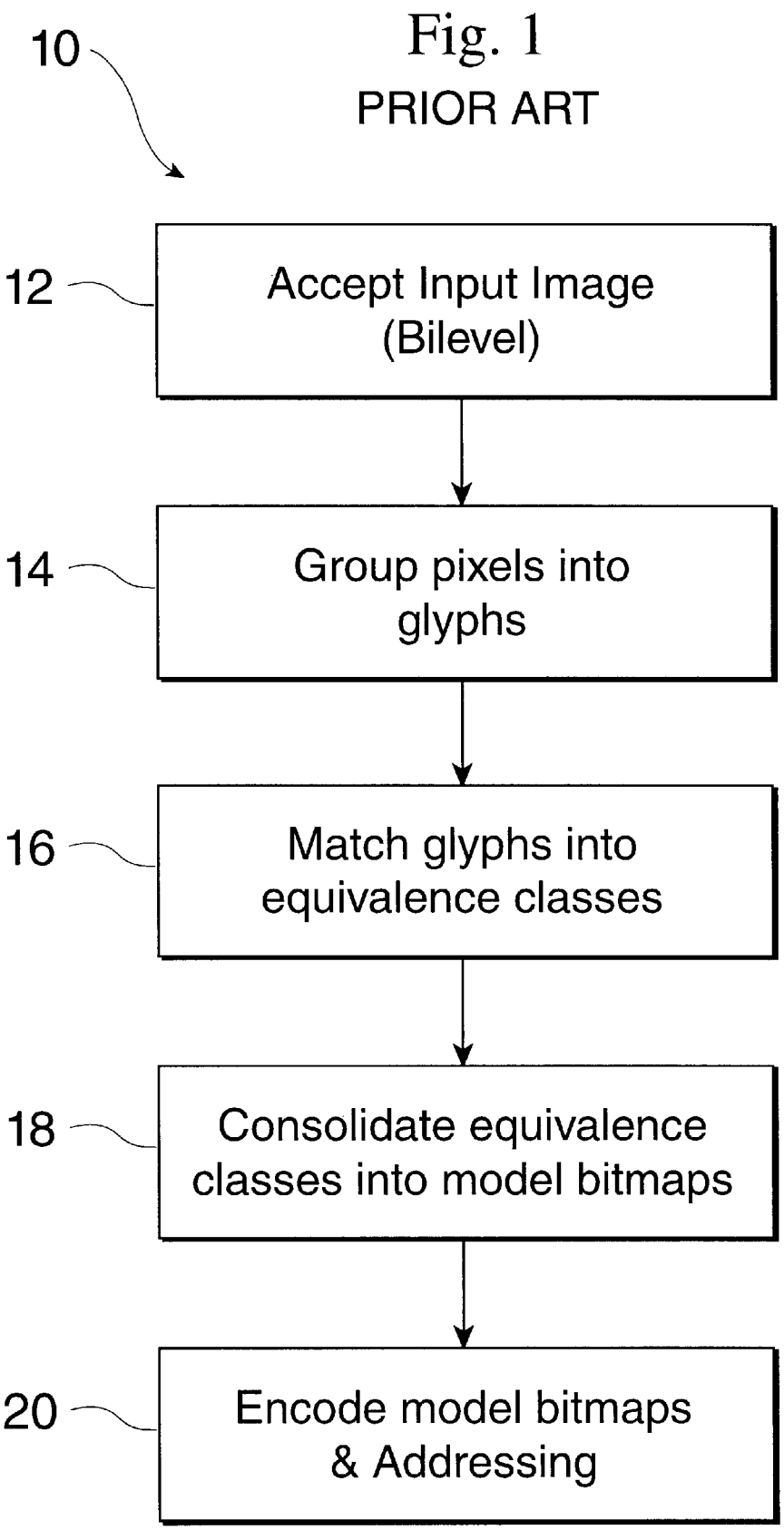

Referring now in detail to the drawings, wherein like numerals will be employed to denote like components, the flow chart of FIG. 1 depicts the general status of known pattern matching based image compression prior to the instant invention. The image compression routine is depicted generally by the reference numeral 10. Upon entering the image compression routine 10, an implementing processor first accepts input image data as indicated in a block 12.

The input image data is in bilevel format, having been previously thresholded pursuant to the heretofore known thresholding techniques such as the plotting of an intensity gray level histogram (illustrated in FIG. 2) of pixel count against gray level values. The threshold value selected was within the gray level values at a minimum pixel count zone 15, between two peaks of maximal pixel count.

After accepting the bilevel input data, the implementing processor grouped the pixels into glyphs, as indicated in a block 14 and thereafter entered a matching routine whereby glyphs were matched into equivalence classes, as indicated in a block 16.

Thereafter, equivalence classes were consolidated as indicated in a block 18 and the final equivalence classes were employed to generate a set of model bitmaps which were thereafter encoded. Symbol bitmap locations were subsequently addressed and encoded, all as indicated in a block 20.

In accordance with the present invention, the compression rate is optimized by selecting weak connectivity as the parameter for converting raw gray level data (each pixel initially has a value between 0 and 255) produced by a scanner or similar device to bi-level, i.e. binary pixel data (where each pixel is either "on" or "off".

Figure 2:
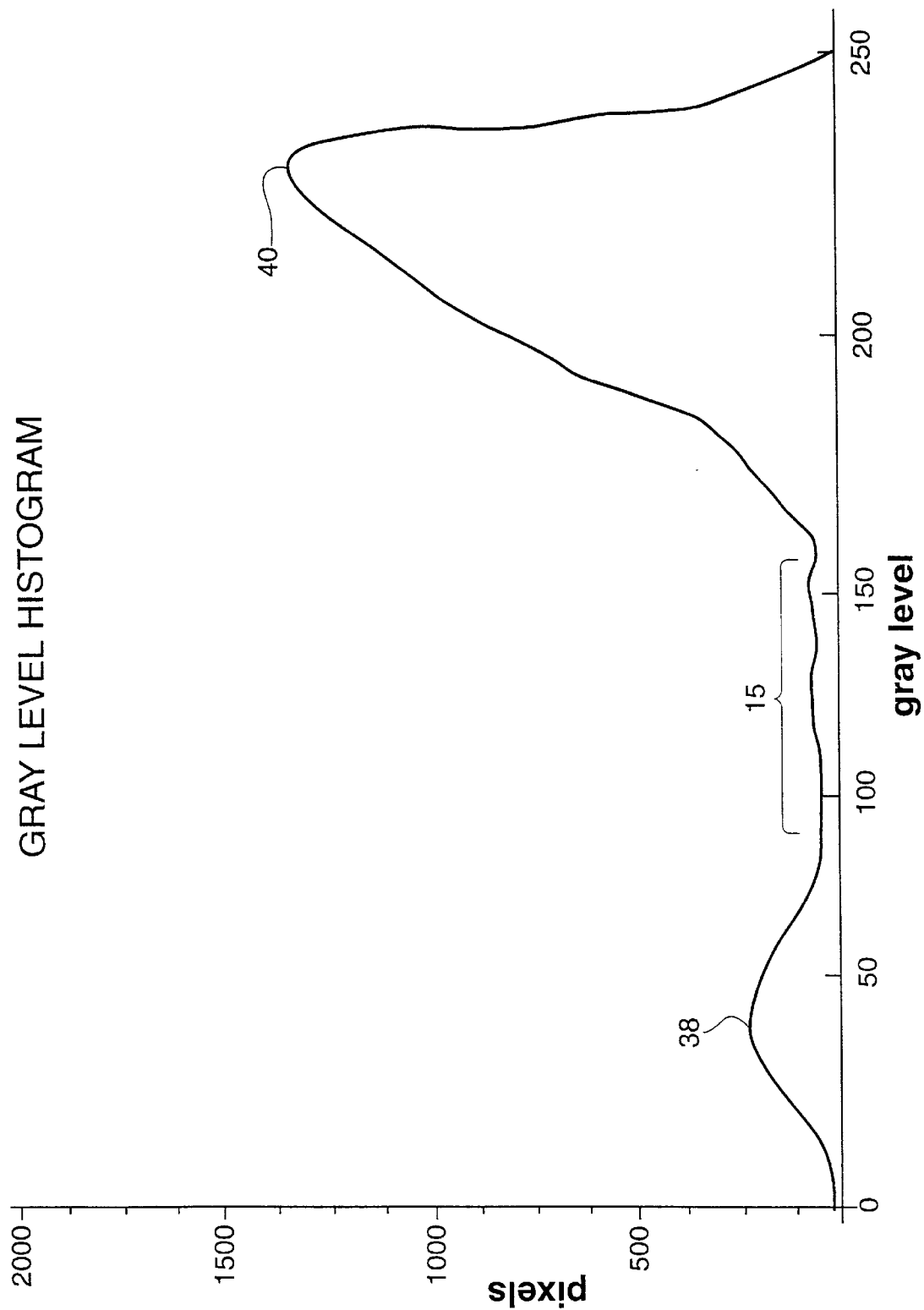
FIG. 2 is a graphical gray level histogram of pixel count against gray level threshold values of a scanned gray level image.

In particular, rather than the FIG. 2 gray level histogram of the prior art, the subject invention computes a weak connectivity histogram from the gray level image.

Since the rate of topological false connections/disconnections on the image has been shown to be proportional to the rate of weak connectivity, minimizing the weak connectivity of the digital image results in finding an image threshold that also minimizes the number of model bitmaps or equivalence classes that are recovered.

Figure 3:
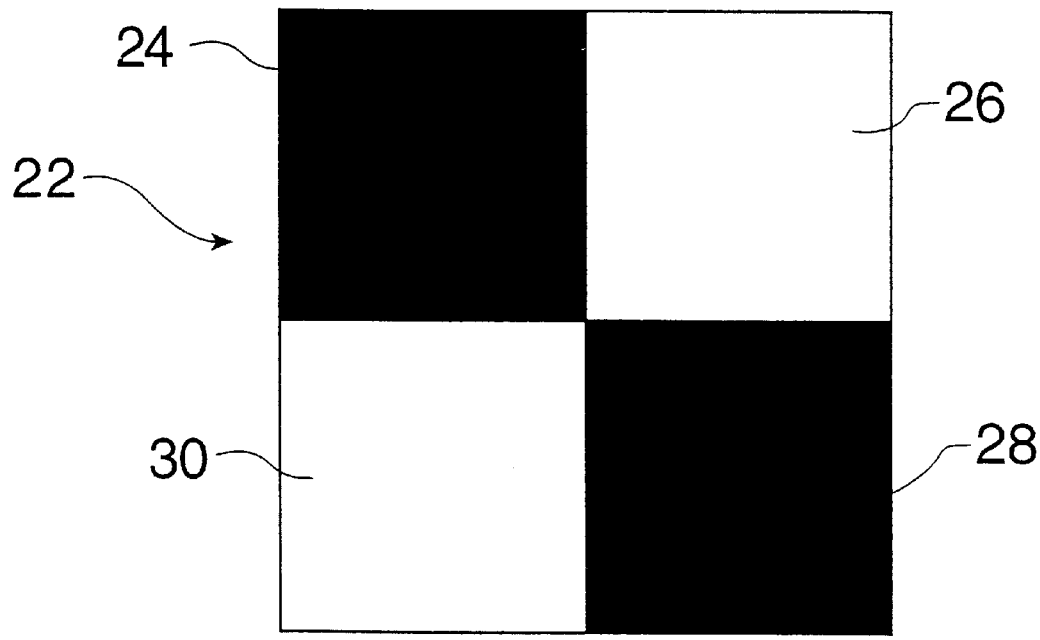
FIG. 3 is a schematized depiction of a 2×2 pixel array comprising a neighborhood and showing a weak connectivity checkerboard pattern.

A weak connection is defined as a 2×2 neighborhood or array 22 of pixels 24, 26, 28, 30 forming a checkerboard pattern, as shown in FIG. 3. In other words, the depicted checkerboard pattern of pixels is topologically "ambiguous" and it is not clear whether or not they represent true connections between pixels. Since a topology preserving digitization (i.e., a digital image after thresholding) should not have any weak connections, the invention preserves the topological structure of the digital document by finding the gray level threshold value which minimizes the total number of weak connections on the digital document.

For example, consider the gray level word "than" shown in FIG. 14 of *Pattern Recognition* 32, supra at page 415, and what happens to this word topologically as the threshold is changed. Threshold versions of the image appear as FIGS. 16(*a*), 16(*b*), 16(*c*) and 16(*d*) at page 416 of *Pattern Recognition* 32. The image thresholded at 174, as shown in FIG. 16(a) is homeomorphic (i.e., topologically equivalent) to the original. As the threshold is lowered to 169, the "a" becomes disconnected while the "n" becomes weakly disconnected (or weakly connected), as shown in FIG. 16(*b*). If the threshold is lowered further to 164, as shown in FIG. 16(*c*), the top part of the "a" becomes weakly connected, while the "n", which was weakly connected, becomes completely disconnected. Finally, when the threshold is lowered to 158, as illustrated in FIG. 16(*d*), the top of the "a" becomes disconnected and the "h" also becomes completely disconnected (not having been previously weakly connected). Thus, weak connectivity is often evident before a set goes from being (strongly) connected to disconnected, or the reverse. This has been confirmed by experiments conducted on several hundred document images scanned at different dpi over several different languages.

It has been empirically determined that at a gray level threshold which minimizes weak connectivity, the binary image is topologically optimal, i.e. total number of false connections and disconnections is minimized.

In FIG. 4, a histogram plotting of weak connectivity against threshold is shown for the same gray level image as the FIG. 2 histogram. Unlike the minimum zone 15 of the FIG. 2 histogram, which is flat or non-well-defined and does not correlate to a geometric or topological property, the FIG. 4 weak connectivity histogram has a minimum 32 at a threshold value of 184 that is generally very well-defined.

FIG. 5 comprises a graph of the number of equivalence classes or model bitmaps recovered for each threshold value in the range 140–255 for the same gray level image as the FIG. 2 and FIG. 4 histograms. As can be seen, the threshold value of 184, which minimizes the number of equivalence classes, is the same threshold value which minimizes weak connectivity shown in FIG. 4.

In accordance with the invention, gray level thresholding of an image can be implemented quickly with only a single pass of the image.

To determine the threshold with the fewest checkerboard patterns, an N×N pixel array, representing the gray level captured document image, is traversed row by row and successive a 2×2 neighborhoods or arrays of four pixels are analyzed one at a time. Traversing the 2×2 array 22 of FIG. 3, for example in a clockwise fashion and starting from the upper left pixel 24, the four pixels being analyzed are: 24, 26, 28 and 30. Denoting the pixels 24 and 28 as part of set A and the pixels 26 and 30 as part of set B, within each of sets A and B the pixels are designated as either min or max by their relative values within the set.

Referring to FIG. 3, it should be readily understood that a checkerboard appears when there is no overlap of gray level values between the A set of pixels and the B set of pixels. Furthermore, in such a case, where the sets of pixels are disjoint, a checkerboard will appear when the threshold (t) is set to any value equal to or greater than $a_{max}$ and strictly less than $b_{min}$.

Figure 6:
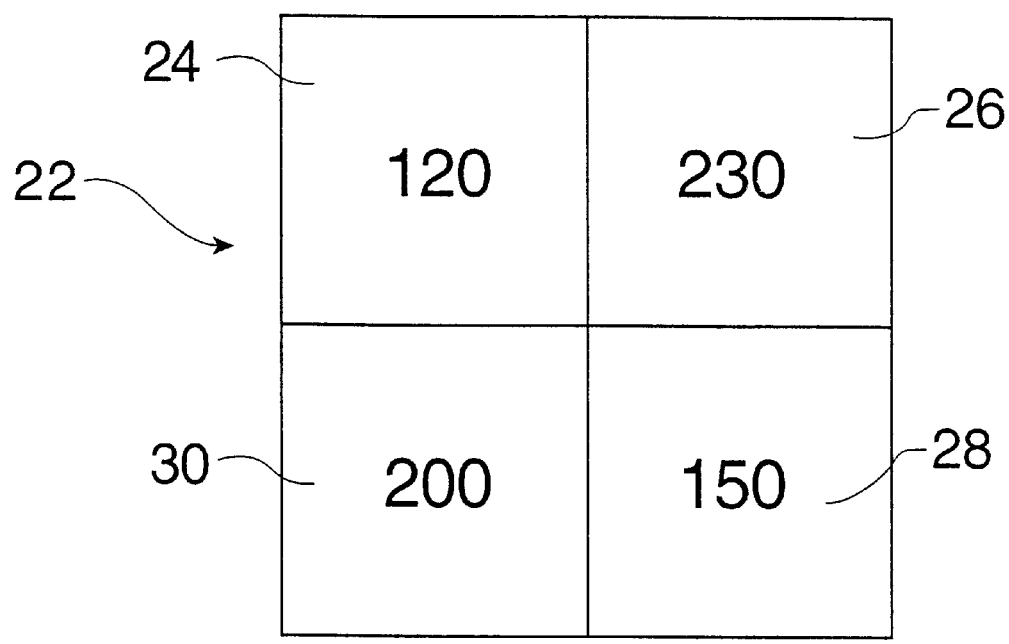
FIG. 6 is depiction of the pixel array illustrated in FIG. 3, however indicating gray level values.

As the array of pixels of the document is traversed, two counters are maintained: plus_chk[ ] and minus_chk[ ]. As each 2×2 array is traversed in accordance with the subject invention, plus chk is incremented once for each threshold at which a checkerboard appears. Similarly, minus_chk is incremented once for each threshold at which a checkerboard is lost. For example, consider the 2×2 array 22 with the gray level values of the pixels 24, 26, 28 and 30, illustrated in FIG. 6 and showing disjoint sets of pixels with $a_{max}$ equal to 150 and $b_{min}$ equal to 200. A checkerboard will appear when t is set to 150, but it will not disappear until t is set to 200. Thus the counter plus_chk is incremented by one at t=150 and the counter minus_chk is incremented by one at t=200.

A third array chk[ ] is computed for each value of t after the N×N array is completely traversed. The array chk[ ] computes the total number of checkerboards for each t by setting chk[t]=chk [t−1] (the total number of checkerboards at the preceding threshold)+plus_chk[t] (the number of checkerboards turned on at value t)−minus minus_chk[t] (the number of checkerboards turned off at value t). Alternatively, chk[ ] can be dynamically computed as the N×N array is traversed.

Figure 7:
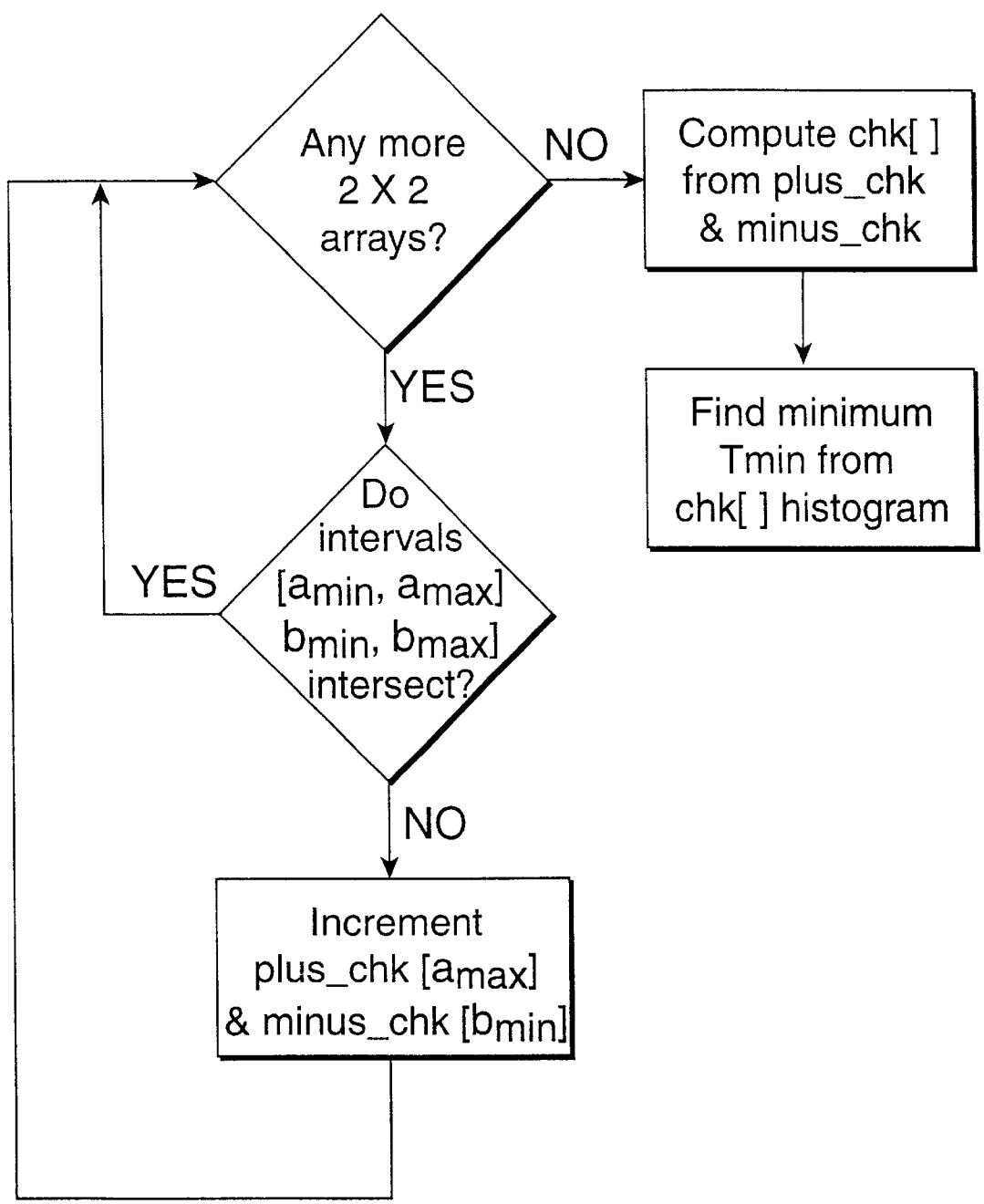
FIG. 7 is a flow chart depicting a routine for generating the histogram of FIG. 2.

Once the array chk has been computed, the local maxima are determined. The maxima that do not have sufficient local support in either depth or bredth are eliminated. In general, there are two principal maxima 34, 36 that are encountered in computing the gray level histogram. The minimum 32 lies in between the two maxima 34, 36. Usually, one of the two weak connectivity maxima 34 occurs somewhere below a gray level value of 100, while the second 36 has a gray level value greater than 200. Once these two maxima have been found, the smallest minima in between these two maxima is selected as the threshold value for the digital document. A flowchart of a routine for efficiently generating the weak connectivity histogram and determining the optimal threshold value is shown in FIG. 7.

It is possible, however, for several potential cutoff values to be identified with relatively good minimums, within an acceptable degree of error. In this situation it is possible to confirm the proper threshold cutoff value by examining the gray level histogram. A generally bimodal distribution is found in the gray level histogram of FIG. 2, with two peaks 38, 40 corresponding to the mean "on" pixel and "off" pixel values of 145 and 215. Somewhere between these two maxima is the appropriate cutoff. A correspondence exits between FIG. 2 gray level histogram and the procedure for identifying the cutoff at which there are a minimum number of checkerboards to confirm that the gray level value t is the appropriate threshold value.

An alternative to traversing the N×N array in one pass is to recursively subdivide the document page into multiple subimages and solve for the weak connectivity threshold of each subimage before moving on to the next subimage. This would be particularly useful where one expects format changes, such as font styles and sizes, to appear on a single page. The document page can be divided into 4 quadrants for example.

Figure 8:
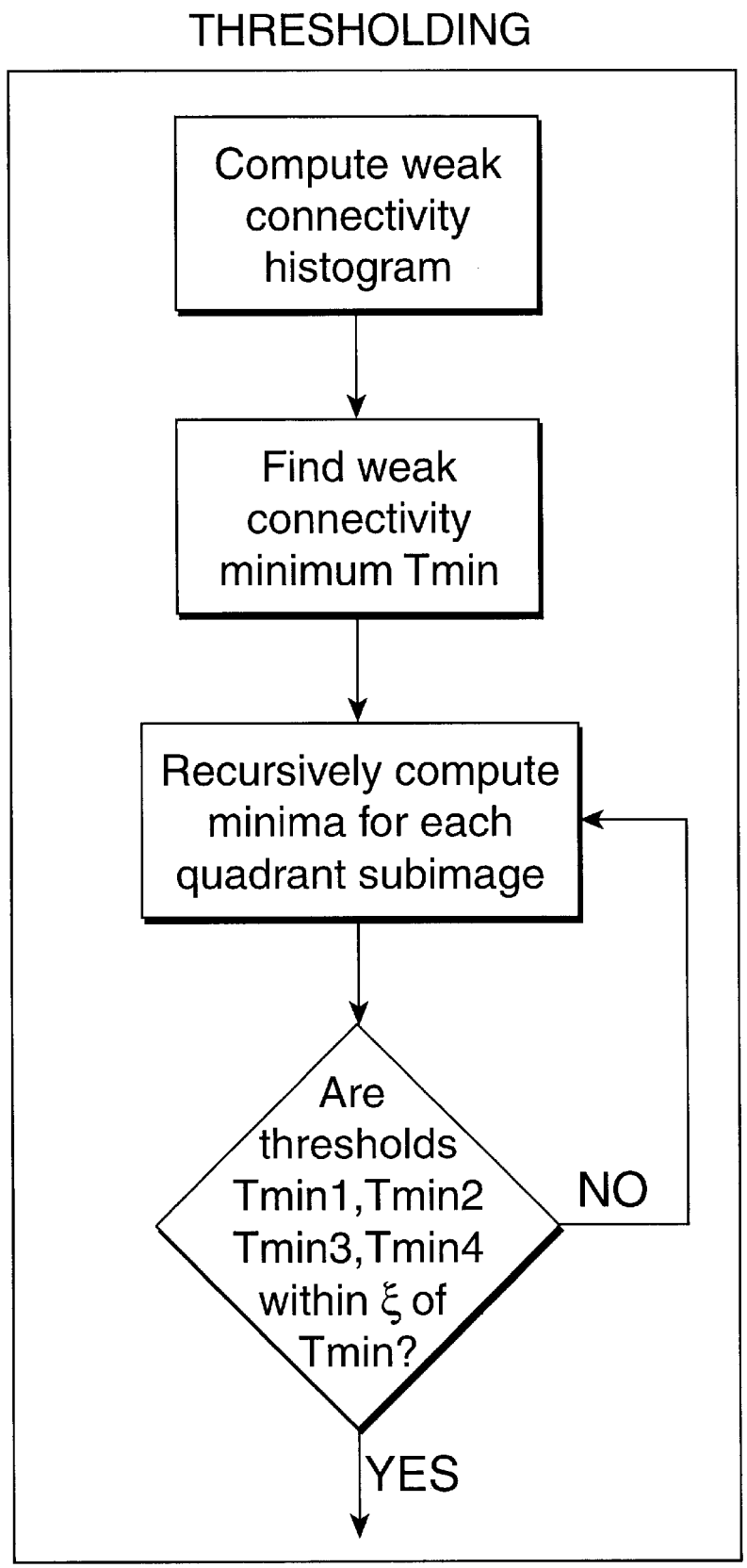
FIG. 8 is a flow chart depicting a routine for recursive division of a page into quadrants for determination of a threshold.

Alternatively, the document page is divided into quadrants, and each quadrant is recursively divided into quadrants. After t is solved for recursively, all the subimages are then compared to see whether they are within an acceptable error tolerance of ξ from each other as illustrated in the FIG. 8 flow chart. Where the thresholds are distinct, the gray level of each subimage is converted to binary form using the threshold corresponding to that subimage. While the respective thresholds can also be used where they are similar to one another, it is found that more desirable results are achieved where the similar thresholds are averaged together for a single uniform threshold among similar subimages. The preferred threshold tolerance is approximately ξ=10.

Once a threshold value has been determined, the digital document is converted from gray level to bi-level. There is no guarantee that this digital image has no weak connections. It is preferable from the perspective of subsequent image processing operations and model matching that the document be entirely strongly connected, if possible. In accordance with the invention, the digital document, thresholded at a gray level value minimizing the weak connectivity, is converted to a digital image that is well-composed, i.e., strongly connected.

This is done by searching for false connections, since they are generally more frequent than false disconnections. In other words, we look for two "on" pixels that are only vertex-connected, that are part of a checkerboard, and that are located where they are likely to be falsely connected.

It is recognized that pixels are likely to be properly connected if there is a four-connected path between them. A four-connected path is a path of linked "on" pixels which are connected by edges rather than vertices. Where two "on" pixels have a four-connected path but are themselves directly connected through vertices and are part of the same checkerboard pattern, a third pixel from the checkerboard is turned "on" to convert these pixels from being weakly connected to strongly connected. While either of the two "off" pixels in the checkerboard can be turned "on", it is preferable to turn "on" the pixel whose value is closest to the threshold value t.

Another step in reducing weak connectivity in the bilevel image is to turn "on" (set to 1) the "off" (0-valued) pixel of a local checkerboard configuration that is closer to the threshold value of t if either (but not both) of the black pixels in this configuration is a Singleton pixel using (4,4) topology. Since this singleton black pixel is likely to be the tail end of an object, we convert the weak connection to a strong connection. Finally, all single "on" pixels are considered to be noise and are removed.

In order to compress the document as much as possible, it is desirable to learn the objects of the document so that it is not necessary to store every instance of the object. For example, if the document has many instances of the letter "a", rather than save the entire "a" bitmap for each occurrence it is more efficient to save one model instance. Thereafter, at each location on the document at which the letter "a" should appear, there is a pointer to the single bitmapped model "a". To do this, of course, one must first identify every set of connected pixels which comprise a single object, referred to hereafter as a glyph.

After the glyphs have been computed as practiced in the art, the compression technique of the present invention learns to form equivalence classes from the symbol models.

The basic task in learning the models is to select a distance measure for comparing two glyphs. If the measure is satisfied, then the two glyphs represent the same original letter or other object. The Hausdorff measure has been cited in previous related work on symbolic compression, as in U.S. Pat. No. 5,835,638 incorporated herein by reference. The degree of blurring for a typical scanner is minimal since the scanner is calibrated for the distance from the sensor to the plate glass. As such, the primary error is due to image quantization, i.e. the real grid is mapped to the integer grid. This results in symbols that differ from each other as a result of being translated by different amounts on the grid.

In accordance with the invention, a Quadrant Hausdorff measure that is tighter than the Hausdorff distance and is capable of modeling scanner digitization where the error is primarily due to image quantization has been developed.

Accurate symbol models allow the individual bitmaps of each instance of a letter to be replaced with a pointer to the model, thereby substantially reducing the amount of information required to be compressed and ultimately stored. One of the principal novel aspects of this invention is the use of a discrete shape similarity measure that very closely approximates the scanner digitization process.

The Hausdorff distance has been defined in *Fast Non-Parametric Detection of Regular Structure using Digital Geometric Primitives,* supra at p. 340–341. The Hausdorff distance is a reasonably good model of the digitization process assuming that such a digital capture process included both quantization and blurring errors.

Figure 9:
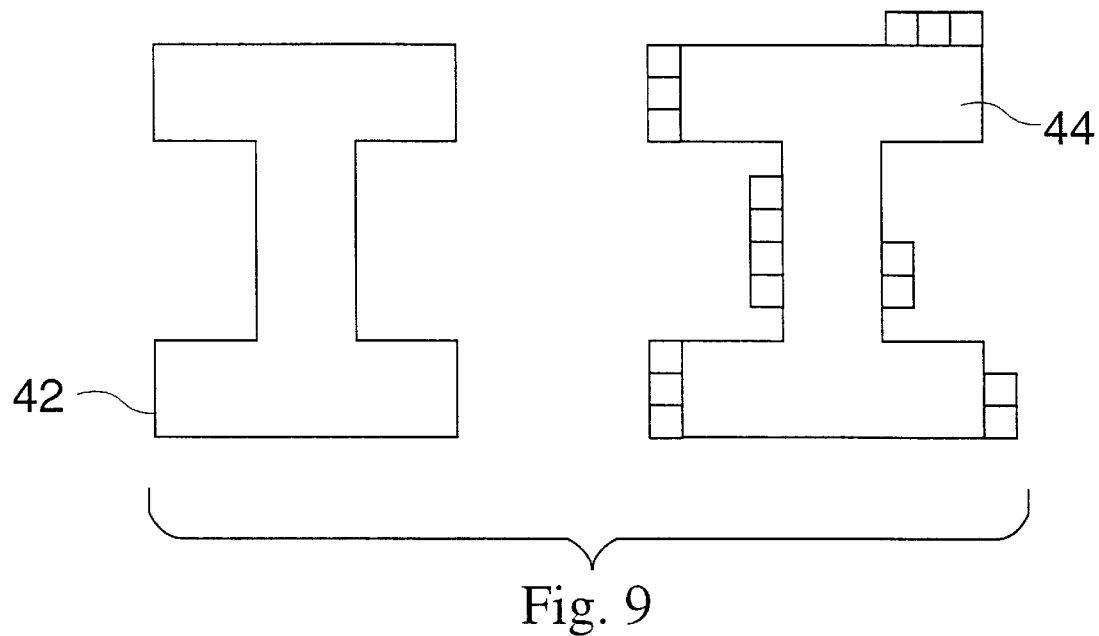
FIG. 9 is a depiction of two models illustrating a match with a Hausdorff distance one.

A With reference now to FIG. 9 a Hausdorff distance comparison is illustrated with respect to a model 42 and model 44. The model 44 is identical to the model 42 except for groups of pixels which extend longitudinally in one direction and laterally in two directions, i.e. on three quadrants. Utilizing the conventional Hausdorff criteria, models 42 and 44 comprise a Hausdorff match with a distance 1.

Using a general Hausdorff distance of 1 would make sense if there were a blurring process that took place during scanner digitization.

Unlike the general case of digitally capturing a picture taken via a pinhole lens configuration, scanning takes place on a flatbed scanner which is calibrated under an assumption that the document is lying flat on the plate glass. In a typical scanner configuration, the effects of blurring are negligible.

The Quadrant Hausdorff distance has application to both lossless and perceptually lossless compression of document images. While many of the criteria used in current model matching are very ad hoc, the Quadrant Hausdorff has been defined in *Fast Non-Parametric Detection of Regular Structure using Digital Geometric Primitives,* supra at p. 341 as follows:

Define $Q_I$, $Q_{II}$, $Q_{III}$, and $Q_{IV}$ to be the closed first, second, third, and fourth quadrants of $R^2$.

For example $Q_I=\{(x, y)\epsilon R^2 | x\geq 0 \text{ and } y\geq 0\}$.

Then we can define the first quadrant directional Hausdorff distance between two sets in $R^2$ as follows:

$h_I(A, B) = \max \min \|b-a\|$, $a\epsilon A$ $b\epsilon B$ $b-a\epsilon Q_I$ and similarly for other quadrants.

Next, we define $H_{ij}(A,B)=\max(h_i(A,B),_j(B,A))$, where i,j are quadrant numbers and $|i-j|=2$. Finally the quadrant bidirectional Haussdorf is defined as $H_Q(A,B)=\min\{H_{I,III}(A,B), H_{III,I}(A,B), H_{II,IV}(A,B)H_{IV,II}(A,B)\}$.

Figure 10:
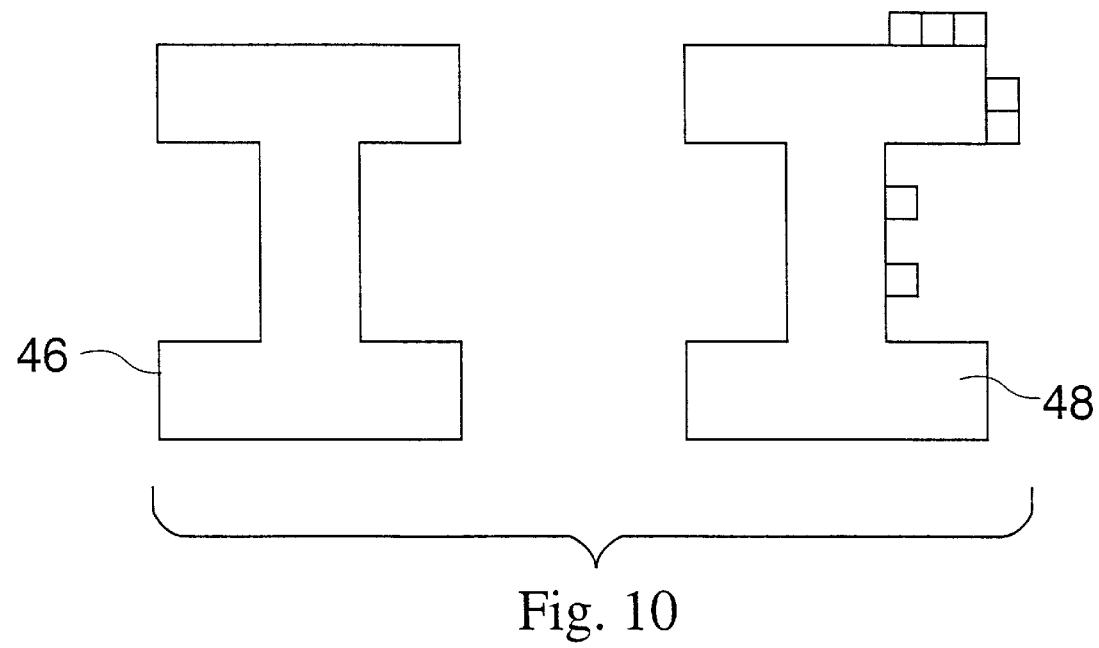
FIG. 10 is a depiction of two models illustrating a match with a Quadrant Hausdorff distance one in accordance with the invention.

This measure is a distance metric that models the fact that, at the very least, a model and its digitization can vary by a Quadrant Hausdorff distance equal to 1. FIG. 10 illustrates a pair of models 46, 48 which constitute a Quadrant Hausdorff match since the Quadrant Hausdorff distance in a single longitudinal and a single lateral direction, (with a translational vector of 45 degrees illustrated) is no greater than one.

Hereinafter, we shall refer to two discrete shapes as being a QH match if they can be brought into translational alignment on the discrete grid such that their Quadrant Hausdorff distance is no greater than one. Having defined the criterion for two discrete shapes to match, we now describe the matching or symbol learning phase of the compression.

Two glyphs which represent the same letter but do not match exactly as a result of scanner digitization will be offset in one direction only. Therefore, if a match for one pixel is found only to the right, then for all other pixels without exact matches, we only look to the right of those positions on the second glyph for a match. Since glyph A must be compared to glyph B and glyph B must be compared to glyph A, once a match is found for a pixel in one direction, a flag is used so that those pixels do not have to be revisited. For example, if pixel 1 in A is found to match pixel 1 in B in a first quadrant direction then a flag is set for those pixels so that they need not be revisited. Similarly flags are set when matches are found in the second, third and fourth quadrants, respectively.

While the Quadrant Hausdorff is efficient, it does not account for blurring and non-monotonicity. Thus a preferred embodiment, particularly for older noisier documents such as those in the original CCITT collection, is to further modify the Quadrant Hausdorff and use what is referred to herein as a Non-Deterministic Quadrant Hausdorff ("NDQ"). NDQ works in a similar fashion to the Quadrant Hausdorff except that we identify those pixels in A which do not have an exact match in B and those pixels in B which do not have an exact match in A and are not within a Quadrant Hausdorff distance 1 but are within a Hausdorff distance 1. NDQ allows the match as long as these pixels are in connected components not more than size two.

NDQ is only used for relatively large shapes, for example, in symbol bitmaps having a height and width in the order of twelve.

Having learned the letter models of the document, bit maps of each model are formed and stored in RAM using any method known in the art. The invention is enhanced if the encoding of these bitmaps is done in as efficient a manner as possible. Although the compression of the document is perceptually lossless, compression of the models needs to be lossless. The state of the art in lossless digital document compression is the group of methods including JBIG that rely on arithmetic coding.

Since various possible embodiments might be made of the present invention and since various changes might be made in the exemplary embodiments shown herein without departing from the spirit of the invention, it should be understood that all matter herein described or shown in the accompanying drawings should be interpreted as illustrative and not in a limiting sense.

Having thus described the invention there is claimed as new and desired to be secured by Letters Patent:

1. In a method for perceptually lossless image compression, the improvement comprising the step of converting gray level pixel image data to bi-level image data as a function of weak connectivity, the step of converting including determining the gray level threshold value resulting in minimal weak connectivity and utilizing such threshold value for conversion to a bi-level image.

2. A method for perceptually lossless image compression in accordance with claim 1, wherein the gray level threshold value is determined recursively.

3. A method for perceptually lossless image compression in accordance with claim 1, the step of converting further including dividing the gray level pixel image data into quadrants and recursively determining the threshold value for each quadrant.

4. A method for perceptually lossless image compression in accordance with claim 3, further including the step of determining whether the threshold value for each quadrant lies within an acceptable error tolerance.

5. In a method for perceptually lossless image compression, the improvement comprising the step of converting gray level pixel image data to bi-level image data as a function of weak connectivity, the improvement further comprising selecting a gray level threshold value which results in the lowest weak connectivity.

6. In a method for perceptually lossless image compression, the improvement comprising the step of converting gray level pixel image data to bi-level image data as a function of weak connectivity, the improvement further comprising examining successive 2×2 matrices of pixels, incrementing a plus register for the gray level value at which a checkerboard pattern first appears and incrementing a minus register for the gray level value at which a checkerboard pattern no longer exists.

7. A method for perceptually lossless image compression in accordance with claim 6, the improvement further comprising determining the total number of weak connectivity checkerboards for each gray level threshold value.

8. A method for perceptually lossless image compression in accordance with claim 7, further including the step of determining two maxima threshold values and selecting a minimum gray level threshold value between the two maximum values.

9. A method for determining symbol matching in a perceptually lossless image compression system, the method comprising accepting as a match, symbols wherein the deviations are limited to a directional Hausdorff distance from the periphery of the symbols.

10. A method for determining symbol matching in a perceptually lossless image compression system in accordance with claim 9, wherein acceptable deviations lie only within a quadrant.

11. A method for determining symbol matching in a perceptually lossless image compression system in accordance with claim 9, wherein deviations are limited to a directional Hausdorff distance one from the periphery of the symbols.

12. A method for determining symbol matching in a perceptually lossless image compression system in accordance with claim 10, wherein acceptable deviations lie only within a Hausdorff distance one.

13. A method for determining symbol matching in a perceptually lossless image compression system in accordance with claim 10, wherein the quadrant lies within two contiguous peripheral surfaces of the symbols.

14. A method for determining symbol matching in a perceptually lossless image compression system in accordance with claim 9, the method further including the steps of:
   a) determining whether the symbols exceed a minimum predetermined height and width,
   b) limiting deviations to a Quadrant Haussdorff distance if the symbols do not exceed the minimum predetermined height and width, and
   c) accepting as a match, symbols wherein deviations are within non-deterministic quadrant of one if the non-deterministic quadrant deviations are in connected components of not more than size two.

15. A method for determining symbol matching in a perceptually lossless image compression system in accordance with claim 14 wherein the minimum predetermined height is twelve.

16. A method of converting gray level pixel image data to a bi-level image, the method comprising the following steps:
   a) deriving a weak connectivity histogram for the gray level image,
   b) ascertaining a minimum weak connectivity value,
   c) determining the gray level threshold value at the minimum weak connectivity value, and
   d) converting the image at the threshold value determined in step c).

17. A method of generating a weak connectivity histogram of gray level pixel image data, the method comprising the steps of:
   a) examining successive 2×2 matrices of pixels of the gray level image data,
   b) incrementing a first register for each gray level value wherein a vertex connected checkerboard pattern of pixels first appears in each 2×2 matrix,
   c) incrementing a second register for each gray level value at which a transition from a checkerboard pattern to a noncheckerboard pattern occurs in each 2×2 matrix, and
   d) calculating the total number of weak connectivity matrices at each gray level value "t" utilizing data stored in the first register and the second register.

18. A method of generating a weak connectivity histogram of gray level pixel image data in accordance with claim 17 wherein the step of calculating the total number of weak connectivity matrices includes:
   i) determining the total number of weak connectivity matrices at the preceding gray level value "t−1", and
   ii) incrementing the number determined in step i) by the difference between the value in the first register at the threshold "t" less the value in the second register at the threshold "t".

19. A method of converting gray level pixel image data into bi-level image data with the weak connectivity histogram generated in accordance with claim 17, the method including the further steps of:
   e) ascertaining a minimum weak connectivity value of the histogram,
   f) determining the gray level threshold value at the minimum weak connectivity value, and
   g) converting the gray level image to a bi-level image at the threshold value determined in step f).

20. A method of converting gray level pixel image data to a bi-level image in accordance with claim 19 further including the steps of:
   h) ascertaining two maxima values of weak connectivity of the histogram,
   i) the step of ascertaining a minimum weak connectivity value in step e) including selecting a minimum weak connectivity value which is between the two maxima weak connectivity values ascertained in step h).

21. A method of converting gray level pixel image data to a bi-level image in accordance with claim 19 wherein gray level threshold values between 0 and 255 are employed, the step of ascertaining a minimum weak connectivity value in step e) including selecting a minimum weak connectivity value between a threshold value of 100 and a threshold value of 200.

22. A method of generating a weak connectivity histogram of gray level pixel image data in accordance with claim 17 wherein the image data is positioned within a defined area, the method further including the steps of:
   e) recursively subdividing the defined area into subimages, and
   f) performing steps a), b), c) and d) for each subimage.

23. A method of generating a weak connectivity histogram of gray level pixel image data in accordance with claim 22 further including the steps of:
   g) determining the gray level threshold value at the minimum weak connectivity for each subimage,
   h) comparing the gray level threshold value at the minimum weak connectivity for each subimage to the values ascertained for all other subimages,
   i) determining whether the gray level threshold value for any of the subimages does not lie within a predetermined tolerance range of the average threshold value of the remaining subimages, and
   j) averaging the gray level threshold values of all subimages which lie within the tolerance range.

24. A method of processing pixel image data for perceptually lossless image compression, the method including the steps of:
   a) examining a first "on" pixel found in a matrix of vertex connected checkerboard pattern pixels,
   b) determining whether there is a four connected path between the first "on" pixel and the other "on" pixel of the matrix,
   c) if a four connected path exists, changing one of the "off" pixels of the matrix to an "on" pixel.

25. A method of processing pixel image data for perceptually lossless image compression in accordance with claim 24, wherein the pixel image data comprises bi-level image data thresholded from gray level image data at a threshold value "t", the method further including the step of selecting, as the one "off" pixel in step c) an "off" pixel which has a threshold value closer to the value "t" than the other "off" pixel.

* * * * *